(12) United States Patent
Arnold

(10) Patent No.: US 11,901,717 B2
(45) Date of Patent: Feb. 13, 2024

(54) BRACKET FOR MOUNTING AN ELECTRICAL BOX TO THE OPEN FACE OF A METAL STUD

(71) Applicant: Stanley Arnold, Santa Clarita, CA (US)

(72) Inventor: Stanley Arnold, Santa Clarita, CA (US)

( * ) Notice: Subject to any disclaimer, the term of this patent is extended or adjusted under 35 U.S.C. 154(b) by 130 days.

(21) Appl. No.: 17/666,892

(22) Filed: Feb. 8, 2022

(65) Prior Publication Data

US 2022/0166200 A1  May 26, 2022

Related U.S. Application Data

(60) Provisional application No. 63/148,109, filed on Feb. 10, 2021.

(51) Int. Cl.
*H02G 3/10* (2006.01)
*H02B 1/48* (2006.01)
*H02G 3/12* (2006.01)

(52) U.S. Cl.
CPC ............... *H02G 3/10* (2013.01); *H02B 1/48* (2013.01)

(58) Field of Classification Search
CPC ............ H02G 3/10; H02G 3/126; H02G 3/12; H02G 3/121; H02G 3/123; H02B 1/48; H05K 5/0204
See application file for complete search history.

(56) References Cited

U.S. PATENT DOCUMENTS

| 4,723,746 A * | 2/1988 | Gould | H02G 3/105 |
| | | | 220/3.9 |
| 2011/0001026 A1* | 1/2011 | Kubsad | A47B 96/067 |
| | | | 248/223.41 |

OTHER PUBLICATIONS

Home Depot, "Customer Reviews for Milton Industries, Inc. FRL Modular System Mounting Bracket", https://www.homedepot.com/p/reviews/Milton-Industries-Inc-FRL-Modular-System-Mounting-Bracket-S-1163-14/301836594/1 (accessed and archived Nov. 21, 2021). Dual mounting platforms.
3D Content Central, "EG-0320-2—Groove Extrusion", https://www.3dcontentcentral.com/download-model.aspx?catalogid=6237&id=1322468 (accessed and archived Nov. 21, 2021). Groove or slotted edge.

(Continued)

*Primary Examiner* — Hoa C Nguyen
*Assistant Examiner* — Amol H Patel
(74) *Attorney, Agent, or Firm* — The Law Office of Scot S. Fagerland, PC

(57) ABSTRACT

A Z-bracket is adapted for mounting an electrical box to the open face of a metal stud. The invention has two mounting platforms with self-tapping screw holes. The flat brackets of an electrical box are secured to these mounting platforms. The invention has a retaining tab with at least one retaining indentation for screwing the retaining tab to the open face of a metal stud. A connector connects the retaining tab to the mounting platforms. The front edge of each mounting platform has a groove, which accommodates the tongue on a tab of the metal stud. Multiple triangular braces connect the mounting platforms to the connector for structural support. The invention is sized to fit a standard metal stud, providing an improved method for attaching electrical boxes to the open face of a metal stud.

7 Claims, 8 Drawing Sheets

(56) References Cited

OTHER PUBLICATIONS

Garvin, "2 Pcs, 4" Square Junction Box, 1-1/2 In. Deep, w/Metal Stud Bracket, (6) ½ In. & (3) ½-¾ In. Side Knockouts, .0625 Galvanized Steel to Bring Power to Electrical Devices", https://www.amazon.com/Junction-Bracket-Knockouts-Galvanized-Electrical/dp/B0798LQVQH (accessed and archived Nov. 21, 2021). Today's industry standard for mounting electric box to metal stud.

Seco-Larm, "Seco-Larm—"Z" Brackets for 1200 lb Series Electromagnetic Locks—Indoor", https://www.uhs-hardware.com/products/seco-larm-z-brackets-for-1200-lb-series-electromagnetic-locks-indoor (accessed and archived Nov. 21, 2021). The basic tri-planar "Z-bracket" structure.

Gaofuya, "10pcs Thick nylon plastic corner brackets 90 Degree Cabinet Furniture Closet angle connecting connector Hardware Accessories", https://imall.com/product/10pcs-Thick-nylon-plastic-corner-brackets-90-Degree-Cabinet-Furniture-Closet-angle-connecting-connector-Hardware-Accessories/Home-Improvement/aliexpress.com/1005001368761715/568-86010090/en (accessed and archived Nov. 21, 2021). Triangular support brackets.

\* cited by examiner

BRACKET FOR MOUNTING AN ELECTRICAL BOX TO THE OPEN FACE OF A METAL STUD

1. FIELD OF THE INVENTION

This invention is in the field of mounting brackets, specifically for mounting electrical gear to studs.

2. BACKGROUND OF THE INVENTION

Electrical light switches and outlets are encased in open-faced metallic boxes, typically 4"×4". Outlet boxes must be mounted to studs before the walls are finished. Metal studs are commonly used in interior walls because they are lightweight. Each metal stud is a single sheet bent into the cross-sectional shape of a typesetting bracket: [. Therefore, each stud has a flat side and an open side. It is easier to mount an electrical box to the flat side of a metal stud than to the open side.

3. DESCRIPTION OF RELATED TECHNOLOGY

The prior art method for mounting an electrical box to the open face of a metal stud is to attach a flat surface to the open side. One common method is to add a piece of metal track. A second method is to purchase a supporting mechanism for the box.

4. SUMMARY OF THE INVENTION

The present invention is a Z-shaped mounting bracket adapted for attaching an electrical box to the open side of a metal stud. It has one or two mounting platforms for attachment to the outlet box, a retaining tab parallel to the mounting platforms, for attachment to the stud, and a connecting tab, perpendicular to the mounting platforms and the retaining tab, which connects the mounting platforms to the retaining tab. In its best mode, the mounting bracket is made of plastic and is structurally supported by a plurality of triangular braces.

5. BRIEF DESCRIPTION OF THE DRAWINGS

Figure 1:
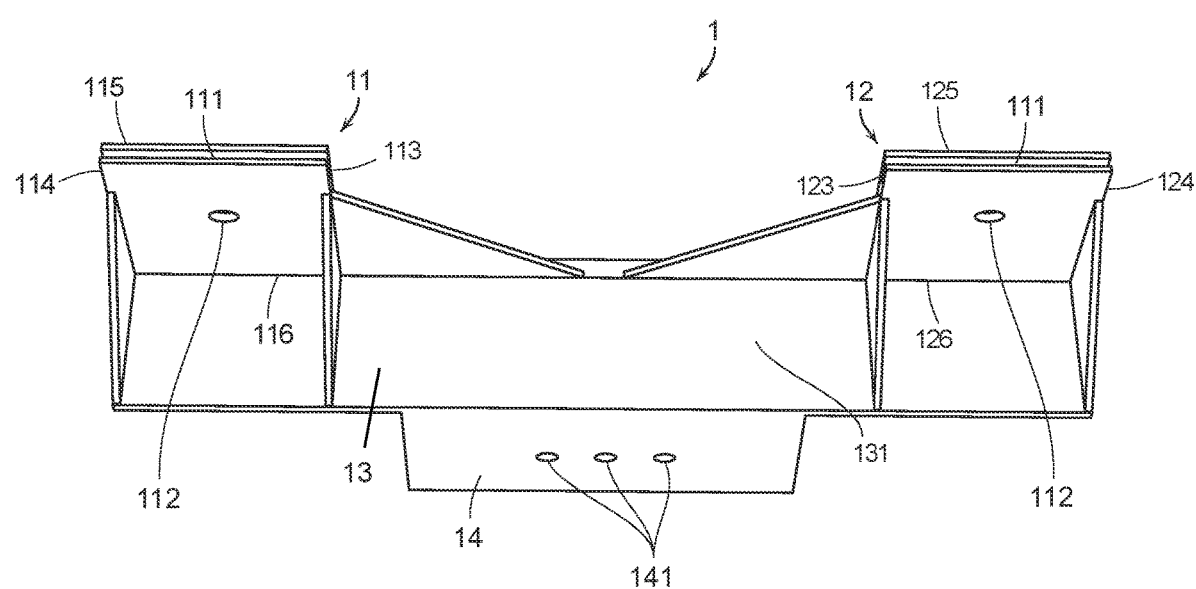
Figure 2:
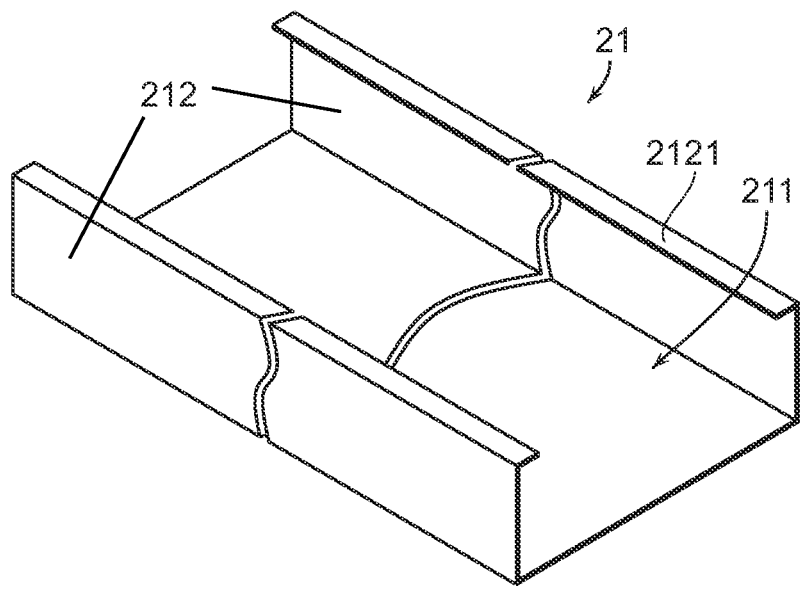
Figure 3:
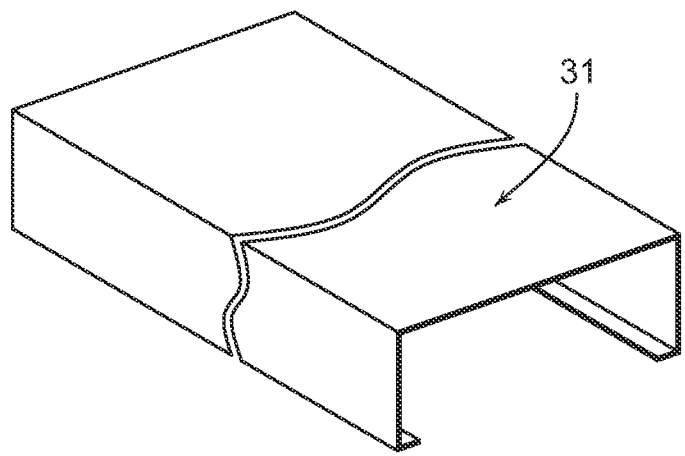
Figure 4:
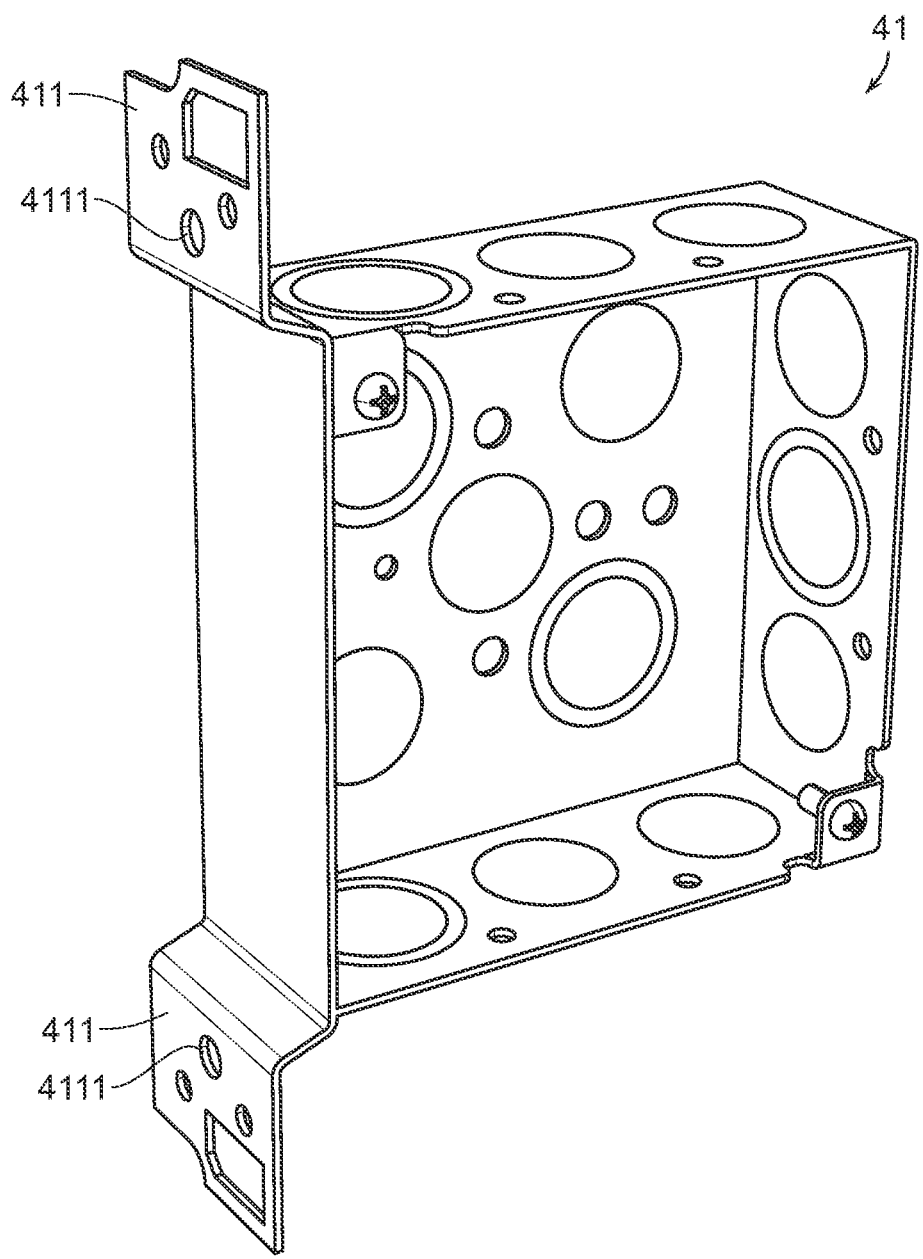
Figure 5:
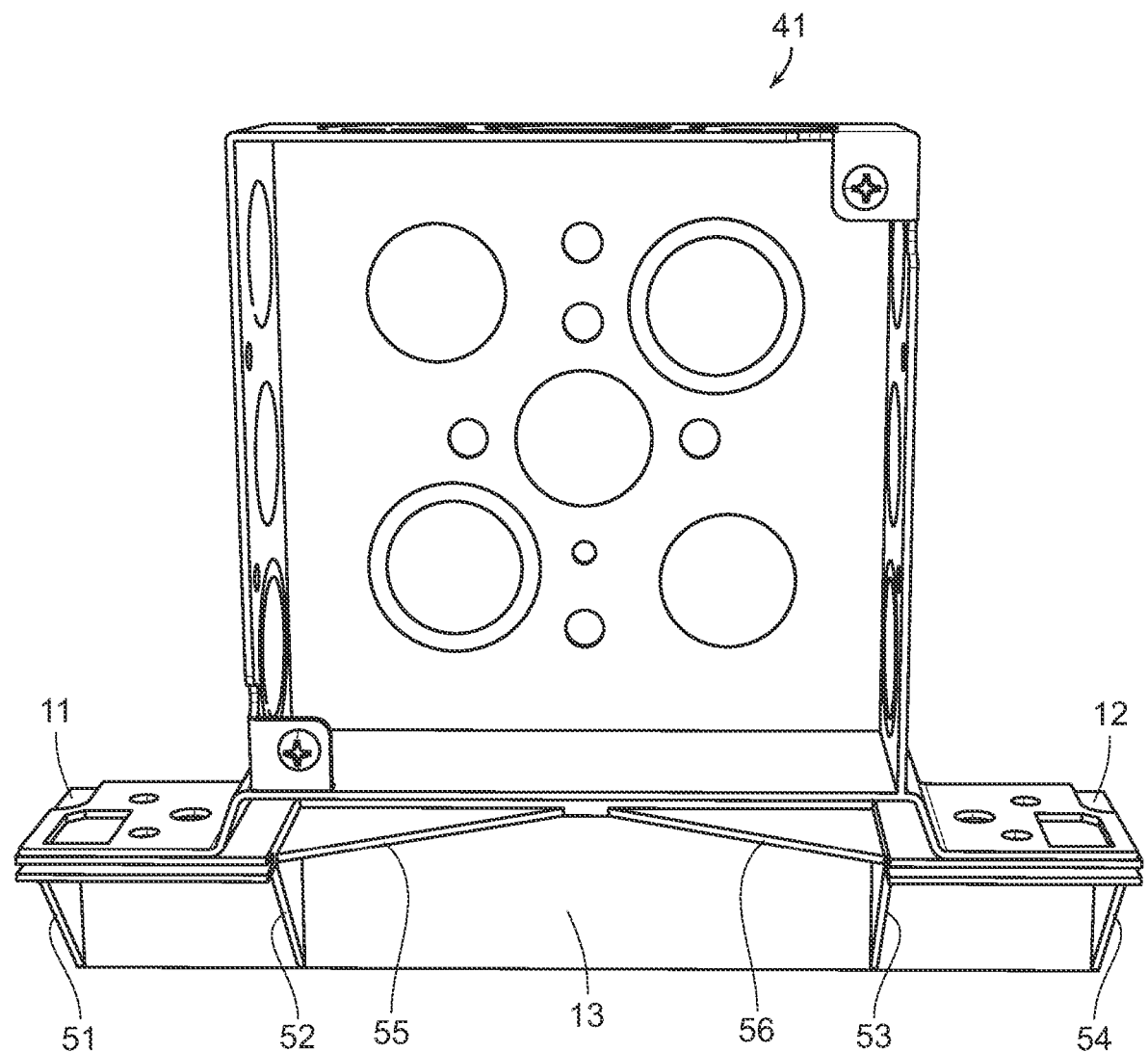
Figure 6:
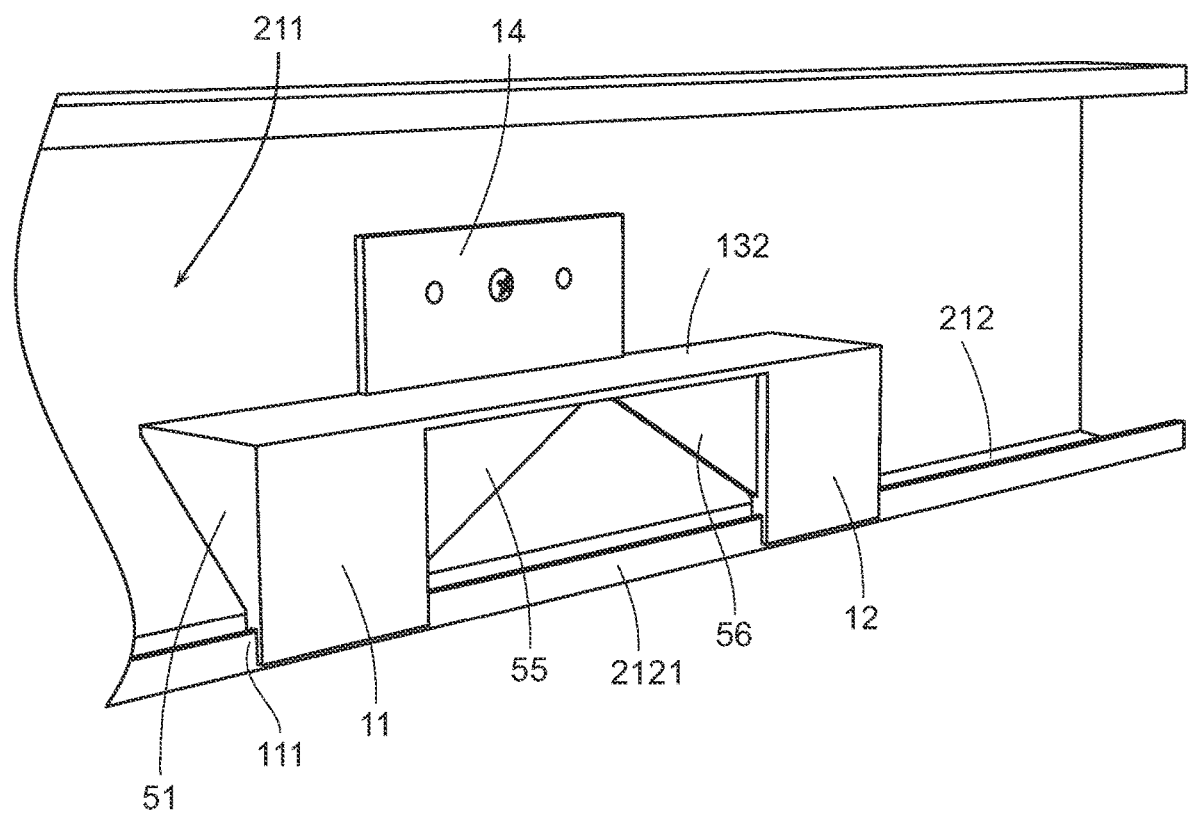
Figure 7:
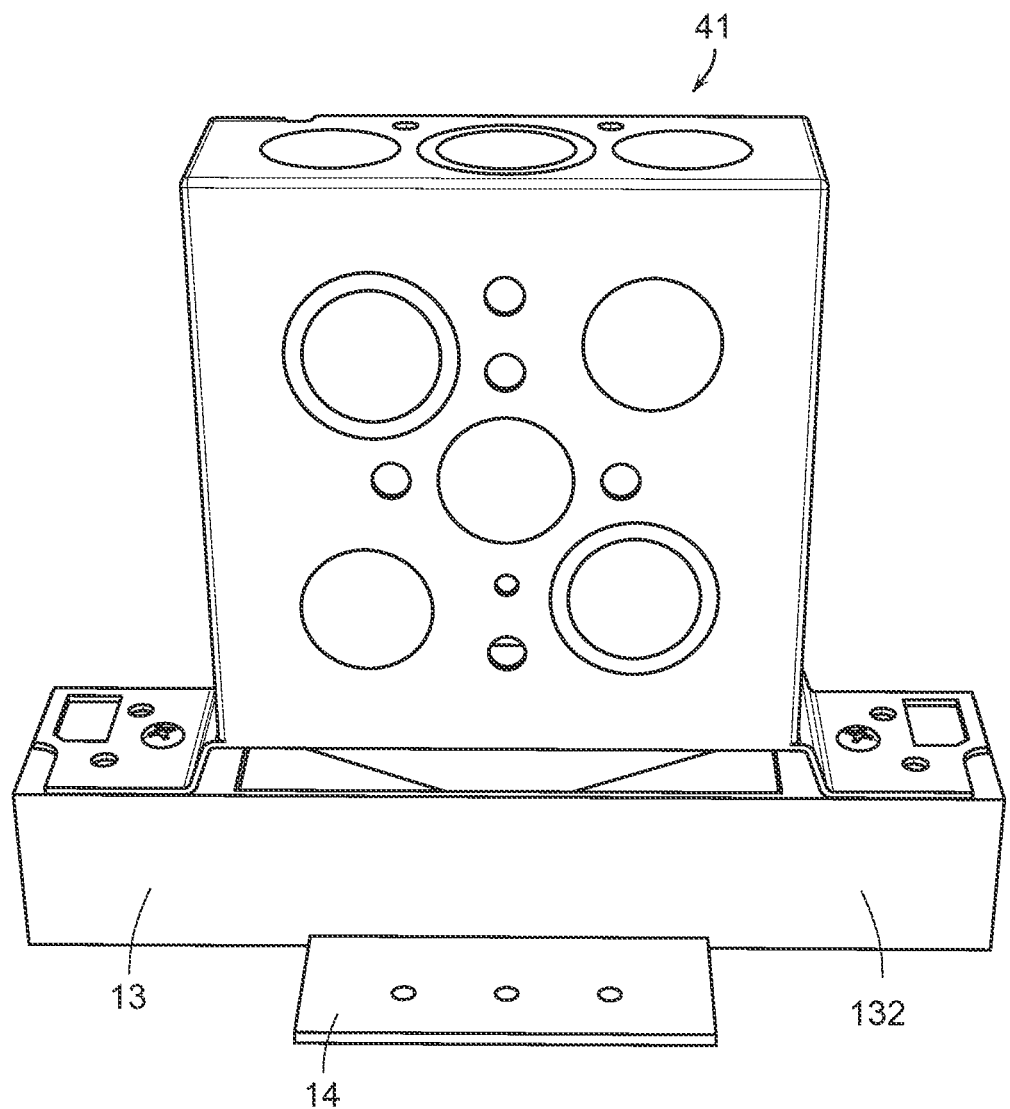
Figure 8:
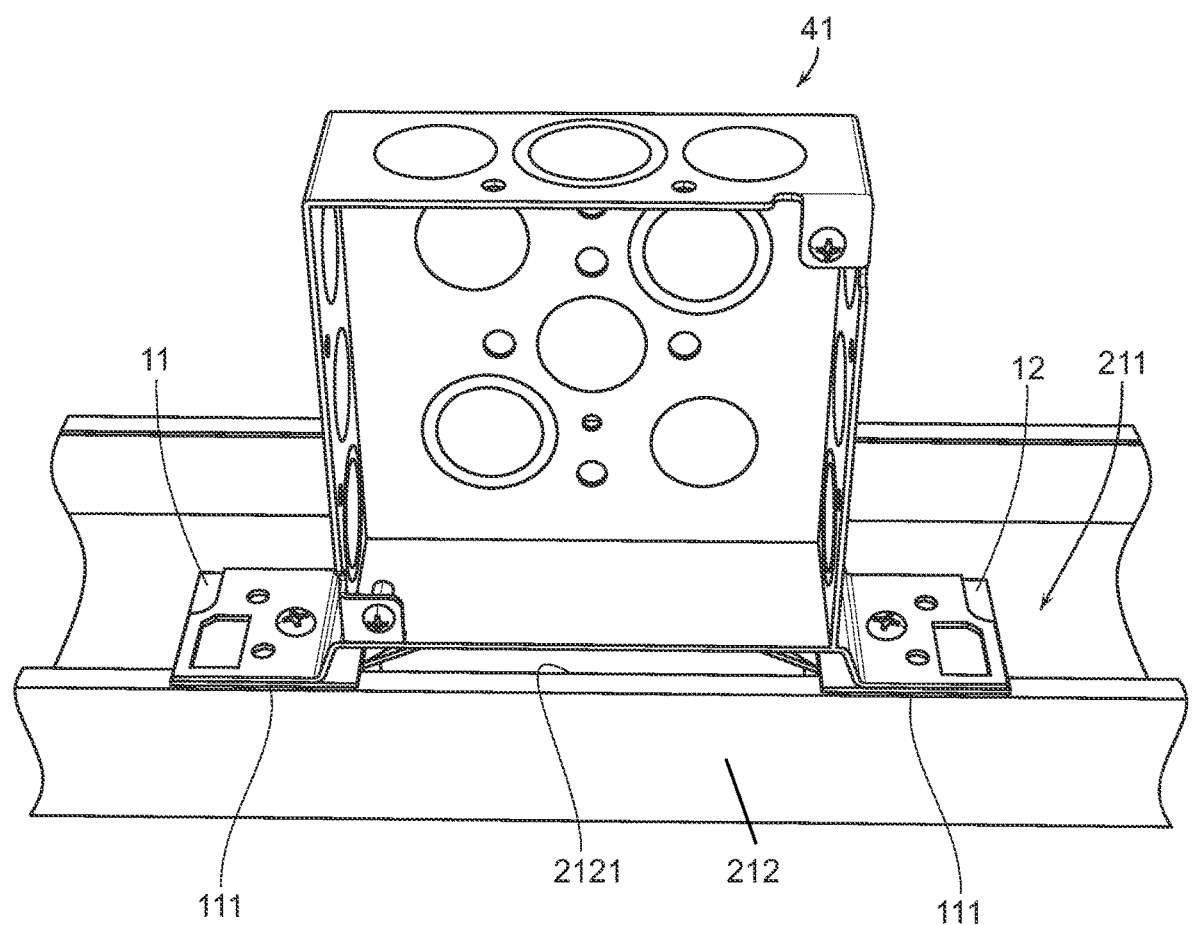
Figure 9:
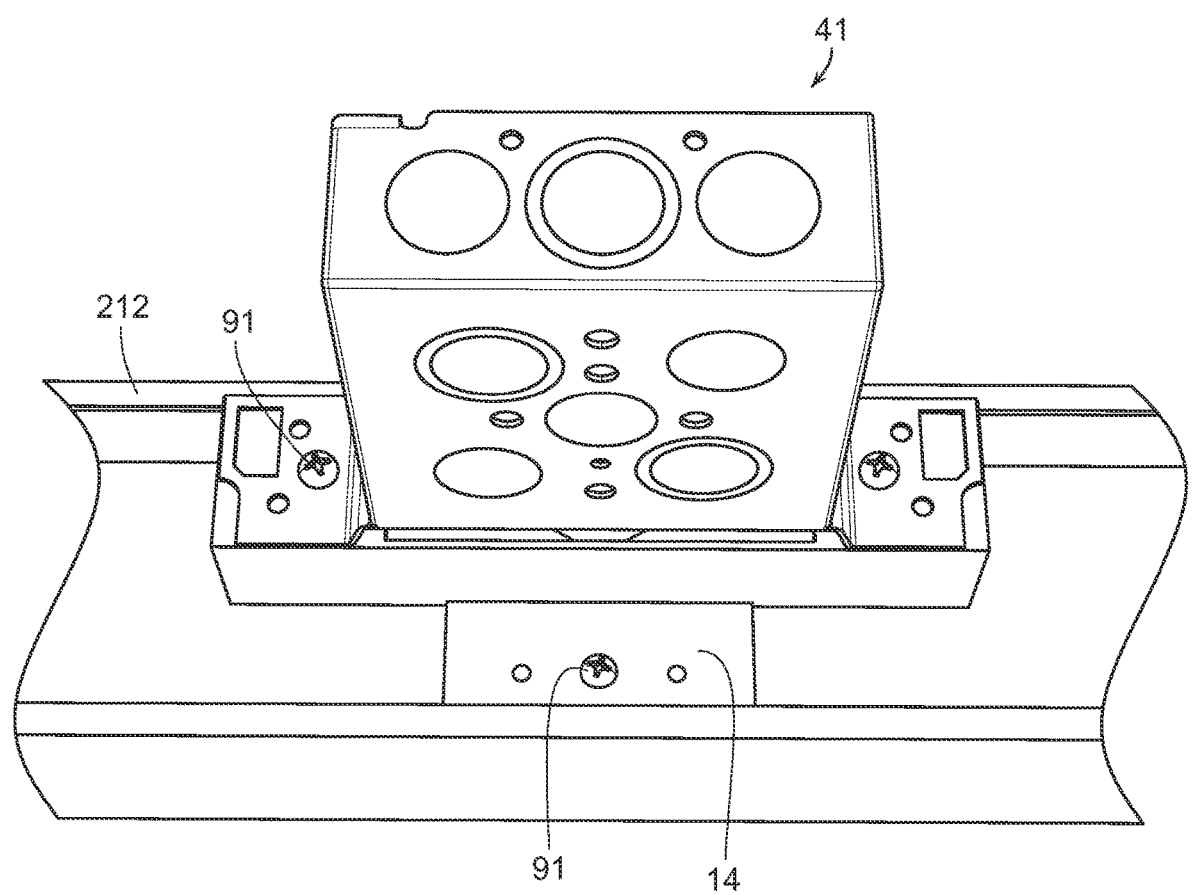

FIG. 1 is a perspective view of the invention.
FIG. 2 shows the open face of a metal stud.
FIG. 3 shows the flat face of a metal stud.
FIG. 4 depicts an outlet box.
FIG. 5 is a front view of an outlet box mounted on the invention.
FIG. 6 shows the invention secured to the open face of a metal stud.
FIG. 7 is a rear view of an outlet box mounted on the invention.
FIG. 8 is a front view of an outlet box mounted to the invention, which is secured to the open face of a metal stud.
FIG. 9 is a rear view of an outlet box mounted to the invention, which is secured to the open face of a metal stud.

6. DETAILED DESCRIPTION OF THE PREFERRED EMBODIMENTS

The invention 1, a mounting bracket, is shown in isolation in FIG. 1. It comprises a first mounting platform 11 and a second mounting platform 12, which is coplanar with the first mounting platform. For purposes of keeping the invention lightweight, the first mounting platform and the second mounting platform are ideally separated by a gap as shown in FIG. 1. The first mounting platform has a first inner edge 113, a first outer edge 114, a first front edge 115, and a first rear edge 116. The second mounting platform has a second inner edge 123, a second outer edge 124, a second front edge 125, and a second rear edge 126. The front edge of each mounting platform has a groove 111. Each mounting platform is perforated with at least one self-tapping screw hole 112.

A connector 13 is attached to the rear edges of both mounting platforms. The connector is a planar component perpendicular to the first mounting platform and to the second mounting platform. It has a front face 131 and a rear face 132 (best seen in FIGS. 6 and 7). The mounting platforms are attached to the front face of the connector.

A retaining tab 14 is connected to the rear face 132 of the connector. The retaining tab is perpendicular to the connector and parallel to the mounting platforms. At least one retaining indentation 141 perforates the retaining tab.

The profile formed by the mounting platforms, the connector, and the retaining tab (e.g. FIG. 1 viewed from the right) is roughly Z-shaped; this bracket belongs to a class known generically as Z-brackets.

In particular, the invention is a Z-bracket adapted to mount an outlet box to the open face of a metal stud. FIGS. 2-4 isolate the "peripherals" of this invention, a metal stud and an outlet box, neither of which is claimed in this invention. A standard metal stud 21 is formed of bent sheet metal rather than a solid three-dimensional block, for obvious reasons of keeping construction lightweight. The stud has an open face 211 and two tabs 212, which are perpendicular to the open face. Each tab 212 has a small tongue 2121, folded slightly inward toward the center of the stud. The opposite side of the metal stud is a flat face 31, as seen in FIG. 3. Using conventional methods, it is easier to mount accessories to the flat face 31 than to the open face 211, due to the protruding tabs.

The invention 1 is designed to fit the open face 211 of a metal stud. For instance, the connector 13 is sized at the same height as a standard tab 212. Thus, when the retaining tab 14 of the mounting bracket is secured to the open face 211 of a metal stud, the mounting platforms 11 and 12 of the invention are aligned with the tongues 2121 on the stud. Further, the grooves 111 on the mounting platforms are sized to accommodate the tongues 2121 for a secure connection. The mounting platforms then occupy the plane where the fourth side of the stud would be if it were a closed shape.

An outlet box 41 is shown in FIG. 4. It includes an enclosure, typically 4"×4", to house an electrical outlet or light switch. The outlet box has two flat brackets 411 for mounting to a stud. Each flat bracket 411 has at least one box screw hole 4111.

FIG. 5 shows an outlet box 41 mounted on the invention. Visible in this view are the first mounting platform 11, the second mounting platform 12, and the connector 13. This figure also displays a plurality of braces. The braces are optional but preferable, especially when the invention is made of plastic. The braces are triangular components for stabilizing the invention, namely by resisting torsion. The ideal configuration includes a first outer brace 51, a first inner brace 52, a second inner brace 53, a second outer brace 54, a first upper brace 55, and a second upper brace 56, as pointed out in FIG. 5. The first outer brace 51 connects the outer edge of the first mounting platform to the connector. The first inner brace 52 connects the inner edge of the first mounting platform to the connector in a plane perpendicular to the mounting platforms and to the connector. The second inner brace 53 connects the inner edge of the second mounting platform to the connector in a plane perpendicular to the mounting platforms and to the connector. The second outer brace 54 connects the outer edge of the second mounting platform to the connector. The first upper brace connects the inner edge of the first mounting platform to the connector and is coplanar with the first mounting platform. The second upper brace connects the inner edge of the second mounting platform to the connector and is coplanar with the second mounting platform.

FIG. 6 shows the invention mounted to the open surface 211 and tab 212 of a metal stud 21. The retaining tab 14 is secured to the open surface 211, for example with a screw through a retaining indentation 141. The first mounting platform 11 and the second mounting platform 12 are flush with the tongue 2121 on the tab 212, so that the groove 111 of each mounting platform accommodates tongue 2121. FIG. 6 presents the best view of the first outer brace 51, the first upper brace 55, and the second upper brace 56.

FIG. 7 is a rear view of the invention with an outlet box 41 mounted to it. The connector 13 and retaining tab 14 are clearly visible in this view.

FIG. 8 (front view) and FIG. 9 (rear view) illustrate the intended use of the invention. An outlet box 41 is mounted to the invention, which is in turn mounted on a metal stud. The front view in FIG. 8 affords a clear view of each groove 111 secured to the tongue 2121 of the tab 212 of the metal stud. In FIG. 9, self-tapping screws 91 are shown securing the invention to the outlet box and to the metal stud.

I claim:

1. A mounting bracket for the open face of a metal stud, comprising:
   a first mounting platform with a first outer edge, a first front edge, a first inner edge, and
   a first rear edge;
   a second mounting platform, coplanar with the first mounting platform, and having a second outer edge, a second front edge, a second inner edge, and a second rear edge;
   a connector perpendicular to the mounting platforms, having a front face and a rear face, with the first rear edge and the second rear edge both secured to the front face of the connector;
   a retaining tab parallel to the first and second mounting platforms and perpendicular to the connector, said retaining tab secured to the rear face of the connector.

2. The invention of claim 1, further comprising a first groove in the first front edge and a second groove in the second front edge.

3. The invention of claim 2, further comprising
   a first outer brace connecting the first outer edge to the connector;
   a first inner brace connecting the first inner edge to the connector in a plane perpendicular to the first mounting platform and to the connector;
   a second inner brace connecting the second inner edge to the connector in a plane perpendicular to the second mounting platform and to the connector;
   a second outer brace connecting the second outer edge to the connector;
   a first upper brace connecting the first inner edge to the connector, coplanar with the first mounting platform;
   a second upper brace connecting the second inner edge to the connector, coplanar with the second mounting platform.

4. The invention of claim 1, further comprising
   a first outer brace connecting the first outer edge to the connector;
   a first inner brace connecting the first inner edge to the connector in a plane perpendicular to the first mounting platform and to the connector;
   a second inner brace connecting the second inner edge to the connector in a plane perpendicular to the second mounting platform and to the connector;
   a second outer brace connecting the second outer edge to the connector;
   a first upper brace connecting the first inner edge to the connector, coplanar with the first mounting platform;
   a second upper brace connecting the second inner edge to the connector, coplanar with the second mounting platform.

5. A mounting bracket for the open face of a metal stud, comprising:
   a first mounting platform with a first outer edge, a first front edge, a first inner edge, and
   a first rear edge;
   a second mounting platform, coplanar with the first mounting platform, and having a second outer edge, a second front edge, a second inner edge, and a second rear edge;
   a connector perpendicular to the mounting platforms, having a front face and a rear face, with the first rear edge and the second rear edge both secured to the front face of the connector;
   a retaining tab parallel to the first and second mounting platforms and perpendicular to the connector, said retaining tab secured to the rear face of the connector;
   a first groove in the first front edge;
   and a second groove in the second front edge.

6. The invention of claim 5, further comprising
   a first outer brace connecting the first outer edge to the connector;
   a first inner brace connecting the first inner edge to the connector in a plane perpendicular to the first mounting platform and to the connector;
   a second inner brace connecting the second inner edge to the connector in a plane perpendicular to the second mounting platform and to the connector;
   a second outer brace connecting the second outer edge to the connector;
   a first upper brace connecting the first inner edge to the connector, coplanar with the first mounting platform;
   a second upper brace connecting the second inner edge to the connector, coplanar with the second mounting platform.

7. The invention of claim 6, further comprising
   a first outer brace connecting the first outer edge to the connector;
   a first inner brace connecting the first inner edge to the connector in a plane perpendicular to the first mounting platform and to the connector;
   a second inner brace connecting the second inner edge to the connector in a plane perpendicular to the second mounting platform and to the connector;
   a second outer brace connecting the second outer edge to the connector;
   a first upper brace connecting the first inner edge to the connector, coplanar with the first mounting platform;
   a second upper brace connecting the second inner edge to the connector, coplanar with the second mounting platform.

* * * * *